March 5, 1929.    T. P. LITTLE    1,704,440
COLLAPSIBLE HOLDING DEVICE
Filed Oct. 31, 1924
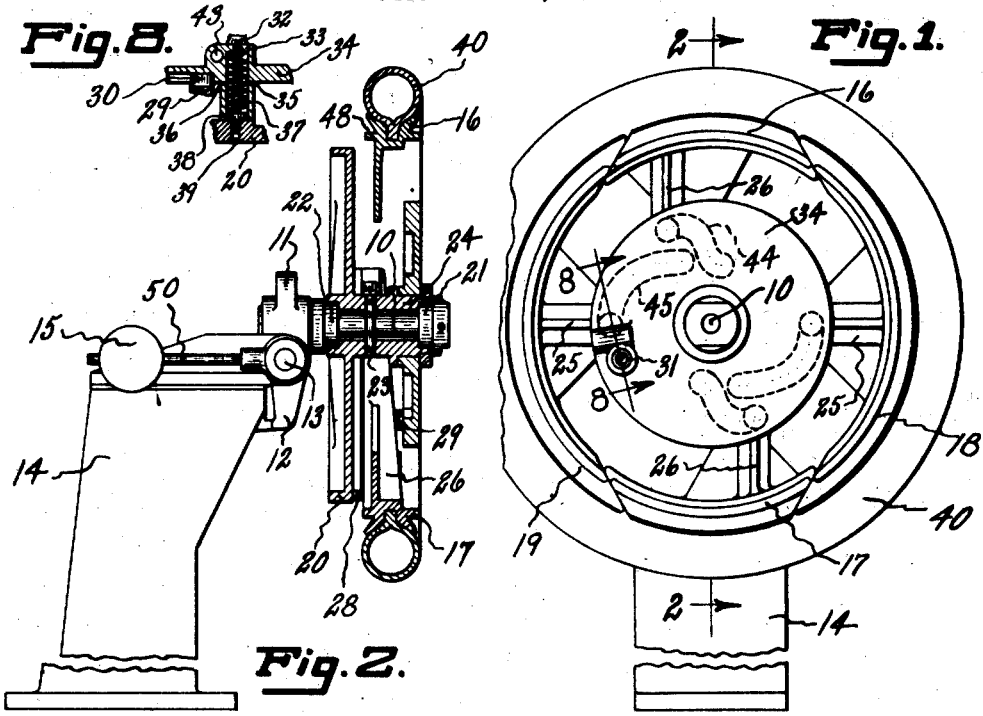
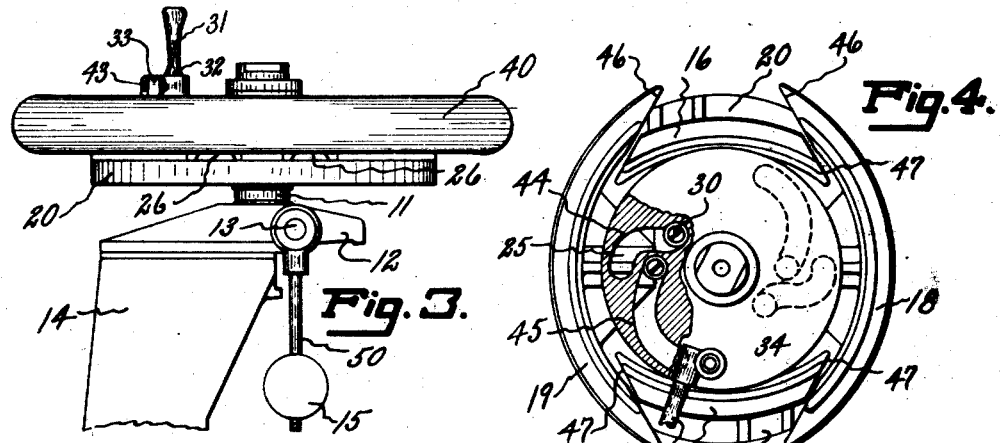
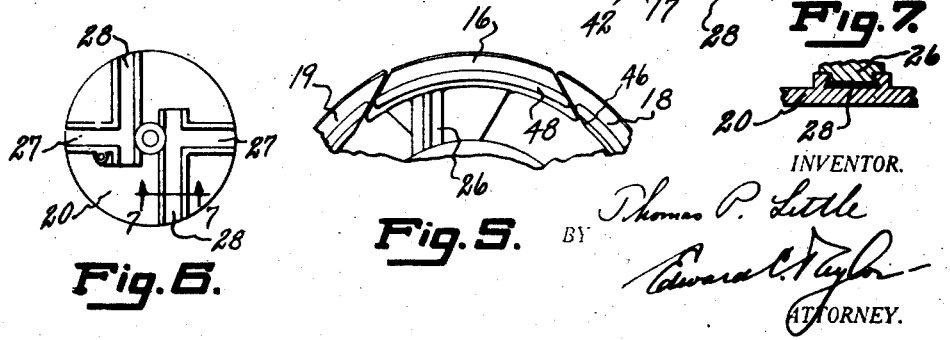
INVENTOR.
Thomas P. Little
BY
Edward C. Taylor
ATTORNEY.

Patented Mar. 5, 1929.

1,704,440

UNITED STATES PATENT OFFICE.

THOMAS P. LITTLE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

COLLAPSIBLE HOLDING DEVICE.

Application filed October 31, 1924. Serial No. 746,928.

The invention relates to collapsible holding devices for bags or tubes employed in the building of pneumatic tire casings. The bags or tubes are adapted to be distended by fluid pressure in order to stretch the casing and hold the same expanded against the mold during vulcanization. In the past it has been the practice to build tires on a metal core, remove the core, and introduce in its stead an inflatable bag commonly called an "air bag" since the inflating medium is usually air. Since the air bag acts as a support for the tire during vulcanization, it has been discovered that the tire casing can be built on it just as well as on a metal core, thus decreasing the cost of producing the tire casing.

The object of this invention is to provide an improved contractible supporting and holding device for air bag formers, with means to position the sections so that the air bags can be put on and taken off the holding device without shifting any of the holding sections out of the plane of operative continuity.

A further object is to provide a sectional holding device, all sections of which are mechanically operative in unison by a single operation. The holding device may be readily and quickly collapsed to permit the easy removal of the air bag and tire casing mounted thereon, and as readily and quickly restored to its operative form with another air bag in building position. This effects a saving of time and labor as compared with the use of holding devices of which the parts must be separately assembled and locked together by the employment of a considerable number of fastening devices, which require a corresponding use of time and labor in application and removal thereof.

With the above and other objects in view, the invention in the preferred form of details will be described in the following specification, reference being had particularly to the accompanying drawings, in which Fig. 1 is a front elevation of the collapsible holding device in expanded position, with a tire building form mounted thereon;

Fig. 2 is a cross-sectional view through the collapsible holding device, taken on line 2—2 of Fig. 1, a portion of the supporting stand and other parts being shown in elevation;

Fig. 3 is a side elevation of the holding device turned to tire finishing position;

Fig. 4 is a front elevation of the collapsible holding device shown in Fig. 1, but with the sections in collapsed or nested position, with certain parts broken away to show the cam paths;

Fig. 5 is a detail view showing the holding sections in an intermediate position during the operation of collapsing them;

Fig. 6 is a detail view of the disk on which the holding sections are supported and slide;

Fig. 7 is a section taken on line 7—7 of Fig. 6; and

Fig. 8 is a section taken on line 8—8 of Fig. 1.

The collapsible holding device is supported on a shaft 10 fixed in a bracket 11 provided with an arm 12. Said bracket is supported by a shaft 13 which is rotatably mounted in a standard 14. On the shaft 13 is mounted an arm 50 supporting a slidable weight 15. The holding sections 16, 17, 18, and 19 are supported from a disk 20 which is mounted upon suitable bearings 21 and 22 on the shaft 10 so as to support the disk for rotation. During the operation of collapsing and expanding the holding sections, the disk is held stationary by a pin 23 which passes through a shoulder 24 of the disk and the shaft 10 on which the disk is mounted.

The holding sections 16, 17, 18 and 19 are movably connected to the disk support 20 by slides 25 and 26 mounted in radial guideways 27 and 28. Cam roll studs 29 are mounted in the slides 25 and 26, and at the outer end of the studs are cam rolls 30. The disk 20 is provided with relatively short radial guideways 27 and relatively long guideways 28 which are at right angles to the paths in which the first-named guideways are located.

A handle 31 with a shoulder 32 is fixed in a boss 33 on a cam disk 34. The boss 33 is cut away at 35 to permit a spring 36 to be mounted on a portion 37 of the handle between the boss 33 and a collar 38. The portion 37 of the handle beyond the fixed collar 38 projects into an opening 39 in the disk 20 and holds the cam disk 34 against rotation while a tire casing is being built on a tire former 40. To rotate the cam plate 34 it is necessary to pull out on the handle 31 so that the collar 38 compresses the spring 36 and the end of handle 31 is free of the disk 20. Then the cam plate may be rotated by a rod 42 which fits into a hole 43 in the boss 33.

The disk or cam plate 34 is provided with a plurality of cam grooves 44 and 45 which engage with the cam rolls 30. The cam grooves 44 come close to the rotary axis of the machine at their inner sides, and at their outer sides are close to the outer edge of the cam plate. The cam grooves 45 do not come so close to the rotary axis of the machine at their inner sides, but their outer sides extend a trifle beyond the outer edges of cam grooves 44 and then incline towards the axis of the machine again to permit a slight return motion of the building sections 18 and 19 to lock or clamp all the building sections 16, 17, 18 and 19 in operative position.

Holding sections 18 and 19 are beveled on their inside ends 46, and the relatively short sections 16 and 17 are beveled on their outside ends 47, so that the ends of the different sections fit together to provide an annular holding device for the air bag 40. The beveled ends of sections 16 and 17 form wedges converging outwardly and away from the axis of rotation, while the beveled ends 46 of sections 18 and 19 are complementary to the beveled ends 47 when in the expanded or operative position. Shown in Fig. 1 is the preferred cross-section of the holding sections for supporting the air bag 40, and they are provided with flanges 48 which act as an outer fabric centering and bead positioning means.

When the cam disk 34 (Fig. 1) is rotated the sections 18 and 19 move out, slightly away from sections 16 and 17 (Fig. 5), and then all the sections move in towards the axis of rotation. The smaller sections 16 and 17 move in nearer the axis of rotation than the larger sections 18 and 19 (Fig. 4) as the holding device is collapsed. On reversing the rotation of the cam plate 34 the sections will be returned to the position shown in Fig. 1, whereby the sections 16 and 17 are clamped in position between sections 18 and 19 by the slight backward movement of sections 18 and 19.

A tire casing may be partially or entirely built on the former 40 in the vertical position shown in Fig. 1, but the device is preferably designed to swing to a horizontal position and is held in said position by the balancing member 15 as in Fig. 3, to serve as a convenient finishing stand whereby the tire may be supported during the various finishing operations such as tucking the edges of the material around the beads.

Having thus described my invention, I claim:

A collapsible air bag supporting device comprising a shaft, two disks, one rotatably mounted on the hub of the other, the second disk provided with a plurality of cam grooves on one surface thereof, a pair of arc shaped supporting sections which are movable in radial directions toward and away from each other and slidably mounted on the first disk, and a second pair of similar supporting sections which are similarly movably mounted on the first disk but in paths at right angles to the paths in which the first-named supporting sections move, whereby the supporting sections are operable to expand and contract in one plane, said supporting sections being of a substantially V-shaped cross-section so as to receive the inner periphery of an annular flexible member and a portion of both sides while leaving the outer surface free for building operations.

THOMAS P. LITTLE